Nov. 4, 1952 — R. C. RUSSELL — 2,616,309
TRANSMISSION
Filed April 29, 1950 — 2 SHEETS—SHEET 1
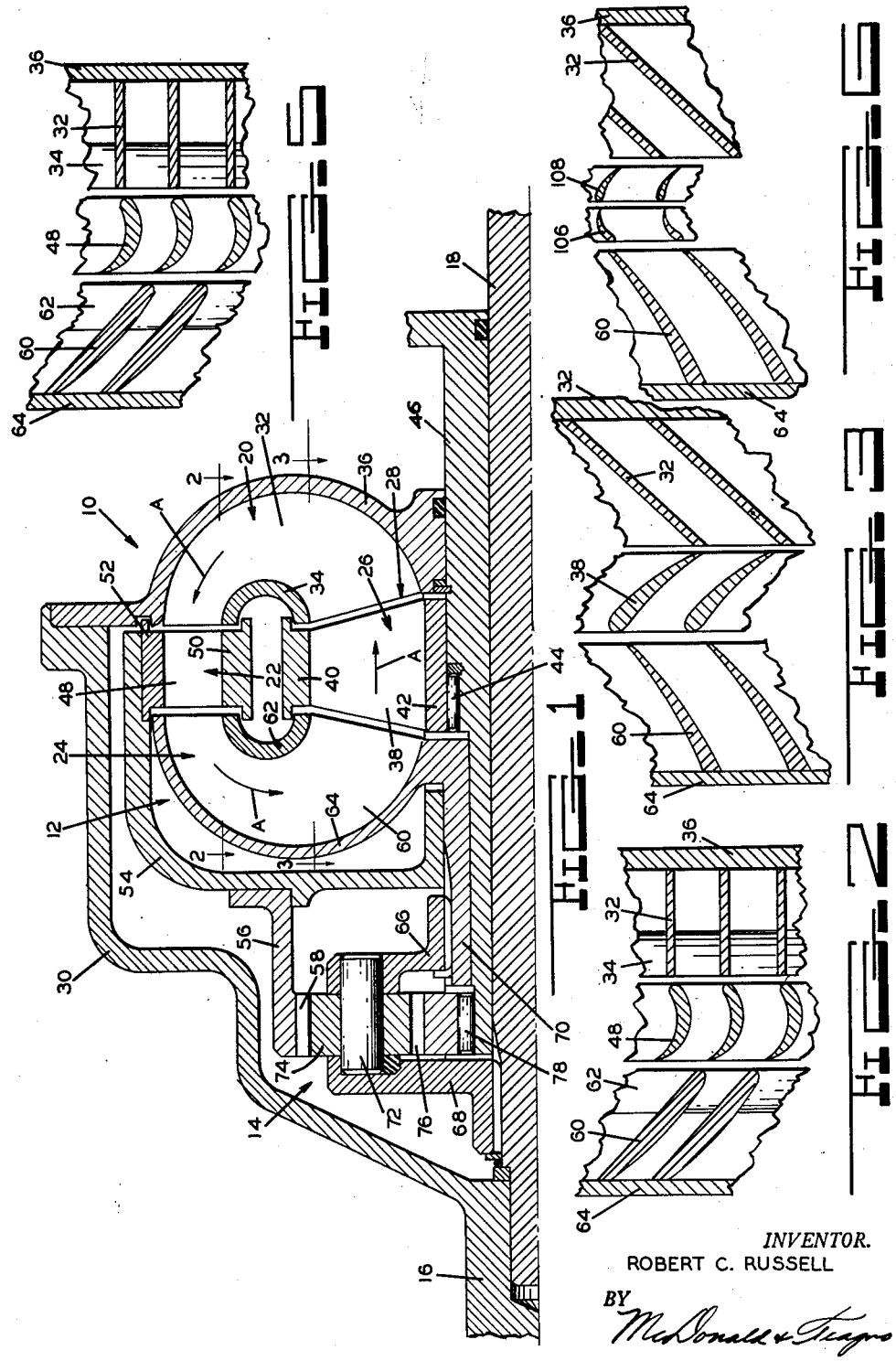
INVENTOR.
ROBERT C. RUSSELL
BY
ATTORNEYS

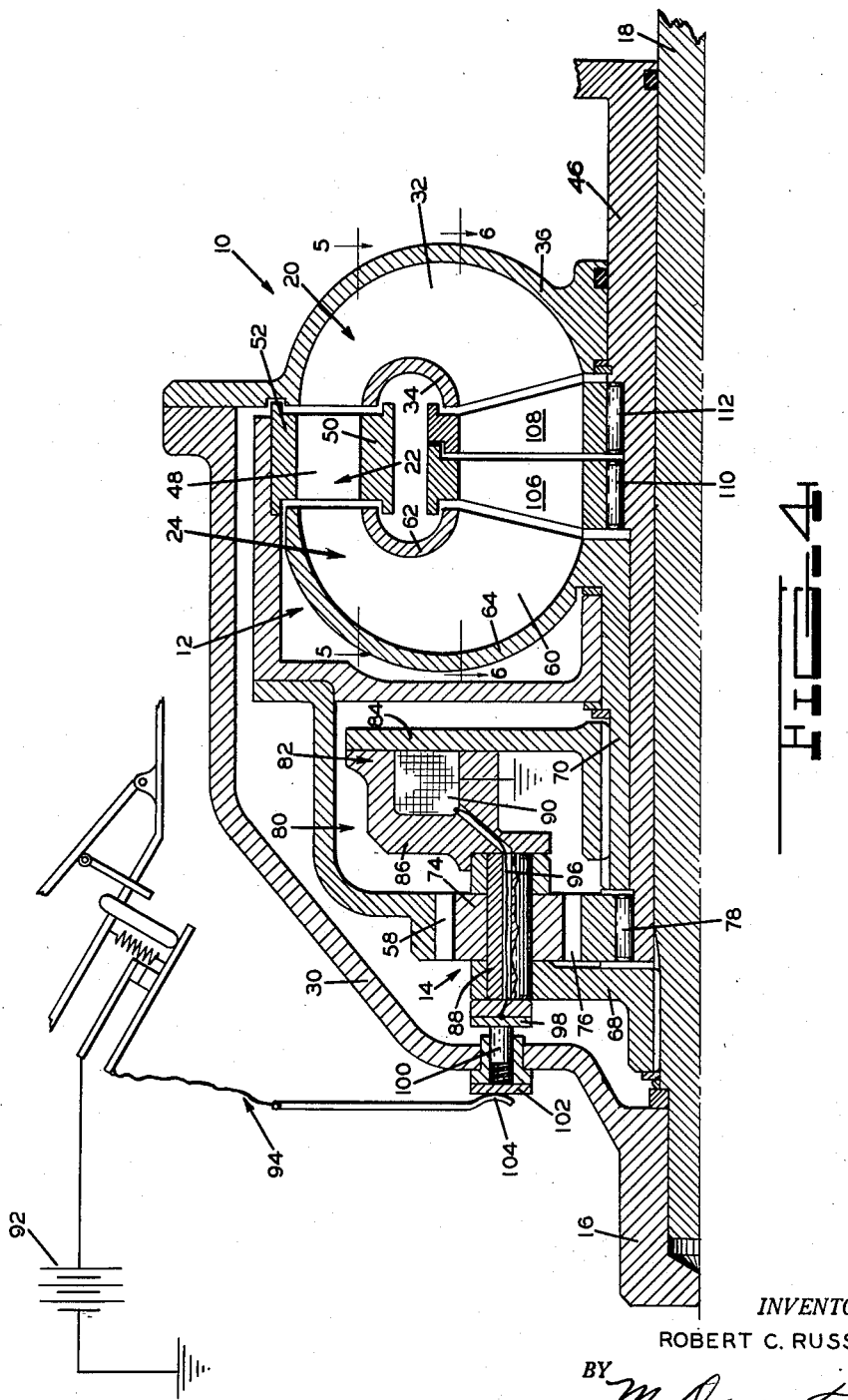

Patented Nov. 4, 1952

2,616,309

UNITED STATES PATENT OFFICE 2,616,309

TRANSMISSION

Robert C. Russell, Euclid, Ohio, assignor to Eaton Manufacturing Company, Cleveland, Ohio, a corporation of Ohio Application April 29, 1950, Serial No. 159,060

23 Claims. (Cl. 74—677)

This invention relates to transmissions and more particularly to automatic transmissions of a basic fluid torque converter nature.

Broadly the invention comprehends the provisions of an automatic transmission of the hydro-mechanical type comprising a pump member, a pair of turbine members and a reactor member, with the turbine members in association with the gearing of a planetary gear system for the desired automatic controlled output of torque.

Although numerous automatic transmissions of the fluid torque converter class embodying pump, turbine, and reactor members have been developed and made, none are known to have taken advantage of the utilization of a pair of turbines of predetermined flow design so coupled to a planetary gear system comprising meshing sun, planet and ring gears as to provide highest torque amplification at low speeds and a continuing but decreasing torque amplification over a long extended range of vehicle speeds.

An object of the invention is the provision of a hydro-mechanical torque converter transmission for vehicles and the like that is relatively simple of design having a minimum of parts yet effective to provide ample torque output over a long range of output speeds and effective to operate substantially as a direct or 1 to 1 ratio fluid coupling when a relatively low torque output is required.

Another object of the invention is the provision of a hydro-mechanical torque converter transmission providing for torque output thereof at static load which is the product of the torque transmitted by a primary turbine thereof and the ratio of a gear system through which the primary turbine transmits its power to an output shaft of the transmission.

A further object of the invention is the provision of a hydro-mechanical torque converter transmission comprising fluid flow cooperative pump, primary and secondary turbine and reactor members, a power input shaft coupled to the pump member, a power output shaft, and a planetary gearing system coupling the turbine members to the output shaft, said primary turbine effective through the planetary gear system upon the initial rotation of the output shaft under load to provide a maximum torque output of the transmission, as a resultant multiple of the torque amplification of the primary turbine and the ratio of the gear system. The secondary turbine in its relation to the fluid transmission amplified torque in proportion to the output torque amplification of the primary turbine such that as the torque amplification of the primary turbine falls off due to changing fluid flow occasioned by increased speed operation of the pump, the amplification of the secondary turbine increases but the over-all output torque of the transmission decreases until a predetermined high speed of the output shaft is attained at which time the transmission transmits substantially a 1-1 ratio between the input and output shafts.

A yet further object of the invention is the provision of a hydro-mechanical torque converter transmission as defined in the preceding object having an accelerator kick-down control permitting of the maximum gear ratio output of the planetary gear system between the input and output speeds of the transmission to overrule the straight fluid coupling operation of the transmission when pass-by acceleration is needed.

Other objects and advantages of the invention will appear from the following description taken in connection with the drawings forming a part of the specification and in which;

Fig. 1 is a fragmentary vertical cross-sectional view of a hydro-mechanical torque converter transmission;

Fig. 2 is a cross-sectional view of the secondary turbine, primary turbine and pump blading taken substantially along lines 2—2 of Fig. 1;

Fig. 3 is a cross-sectional view of the secondary turbine, reactor and pump blading taken substantially along lines 3—3 of Fig. 1;

Fig. 4 is a fragmentary vertical cross-sectional view of a modified form of hydro-mechanical torque converter transmission from that shown by Fig. 1;

Fig. 5 is a cross-sectional view of the primary turbine, secondary turbine and pump blading taken substantially along lines 5—5 of Fig. 4; and Fig. 6 is a cross-sectional view of the primary turbine, primary and secondary reactor and pump blading taken substantially along lines 6—6 of Fig. 4.

Similar reference characters indicate corresponding parts throughout the several views of the drawings.

The present hydro-mechanical torque converter transmission was devised for the purpose of providing a simple, rather economical transmission effective to supply desirable conditions of operation such as are required in automotive vehicles and other powered mechanisms of a like sort, that is high torque amplification at low output speeds and a smooth continuous torque amplification of a decreasing ratio over a long range of increased speed of output of the transmission, such that some torque amplification is available at reasonable high output speeds of the transmission, say for instance under load demand as in the case of a vehicle at between 50 and 60 M. P. H. thereof.

These results are attainable through the provision of a transmission of the fluid torque converter type of novel structural make-up in conjunction with a planetary gear system forming an operative part thereof, said converter comprising basically a pump member, primary and secondary turbine members and a reactor member arranged in fluid flow relation. The blades of the pump, turbine and reactor members are provided with predetermined configuration so as to achieve the desired operational relation of one to the other upon fluid flow therebetween. Whereas the pump is directly coupled to the power driven input shaft, and primary turbine is coupled to the output shaft of the transmission through the ring gear of the planetary gear system and the secondary turbine is directly coupled to the output shaft. The reactor member is arranged relative to a stationary member so as to be restrained from rotation rearwardly and free to rotate in a forward direction. The planetary gear system in its relation to the primary turbine and output comprises a sun gear which is arranged relative to a stationary member as to be restrained from rotation rearwardly while freely rotatable in a forward direction, a ring gear affixed to the primary turbine and planet pinion gears meshing between the ring and sun gears are supported in a planetary carrier which also serves as a connection between the secondary turbine and the output shaft. The maximum or desired torque amplification at varying speed output of the transmission is dependent on both predetermined blade shape and ratio of the gear system.

The primary and secondary turbines have blades of such relation to one another and the toroidal circuit of the fluid torque converter in which they are arranged so as to provide for the maximum desired torque amplification of the primary turbine which under static load of the output of the transmission provides for a maximum torque amplification of the transmission as results from the multiplied torque of the primary turbine and gear system. During this stage of operation the fluid flow is such that no torque amplification is derived from the secondary turbine whereas the maximum relative gear ratio output is obtained when a maximum speed differential exists between the primary and secondary turbines, or when no driving force is imparted by the secondary turbine to the output shaft. As the secondary turbine is driven under the influence of fluid impinged thereon discharging from the primary turbine as a result of the increased speed of the input shaft and pump after the static load is overcome at the output shaft, and secondary turbine amplifies the torque to the output shaft but in a lesser degree than the drop off in torque of the primary turbine which coupled with the decreasing output ratio of the gearing system as the speed of the secondary turbine approaches the speed of the primary turbine, affects a decreased torque transmission to the output shaft. The primary and secondary turbines and the gear system continue simultaneously to transmit torque in a smooth decreasing degree as the speed of the input shaft and pump increases until the speed ratio between the primary and secondary turbine attain an amount equal to or greater than the ratio of the gear system at which time the primary turbine by way of the sun gear running free in a direction opposite to its held position becomes ineffective and the secondary turbine solely transmits torque. The secondary turbine at this stage continues to transmit torque of a decreasing degree until the speed of the secondary turbine approaches that of the pump at which time a fluid coupling operation or substantially 1 to 1 ratio power transmission is reached wherein the reactor member rotates freely in the toroidal circuit.

It is also proposed in cases desiring a further extension of torque amplification to higher speeds of output of the transmission to separate the reactor member into two stages, one for best abutment at low speeds and the other to extend the range of abutment to higher speeds, this being achieved by varied angular disposition of the blades thereof.

As a further variation from the separate reactor stages and for a somewhat additional result, accelerator pedal operated control means effective when pass-by acceleration is desired, to overrule straight fluid coupling operation and introduce the maximum ratio of the gear system by the clutching out of the secondary turbine from association with the output shaft. During this operation the primary turbine which is operating at substantially the speed of rotation of the pump provides for the torque amplification by way of the gear system and its established gear ratio with the sun gear held stationary.

Referring to Fig. 1 of the drawings for more specific details of the invention 10 represents generally a hydro-mechanical torque converter transmission comprising basically a hydraulic torque converter 12 and a planetary gear system 14 interconnected between the input and output shafts 16 and 18 respectively of the transmission.

The hydraulic torque converter comprises fluid flow cooperative pump or impeller member 20, primary turbine member 22, secondary turbine member 24 and reactor member 26 arranged in a toroidal fluid circuit 28. The pump member 20 is fixedly connected to the input shaft 16 by way of a housing 30 adapted to completely enclose the hydraulic torque converter and gear system therewithin and includes compound curved pump blades 32 disposed between inner and outer channel shrouding 34 and 36 respectively for guiding the flow of fluid through the blading. The reactor member 26 is disposed between the discharge of the secondary turbine member and the intake to the pump member and includes curved blades 38 disposed between inner and outer fluid flow guide shrouding 40 and 42 respectively. The outer shroud 42 is engageable with one way roller members 44 mounted upon a stationary quill 46 for controlling movement of the reactor member permitting of rotation in one direction and inhibiting rotation in the opposite direction.

The primary and secondary turbine members which comprise the driven members of the hydraulic torque converter are disposed adjacent one another in the toroidal fluid circuit between the discharge of the pump member and intake of the reactor member. The primary turbine member includes curved blades 48 disposed between inner and outer fluid flow guide shrouds 50 and 52 respectively with the outer shroud directly connected by appropriate flange members 54 and 56 to a ring gear 58 of the planetary gear system. The secondary turbine member includes curved blades 60 disposed between inner and outer fluid flow guide shrouds 62 and 64, the outer shroud 64 of which is directly connected to the output shaft through the medium of flange members 66 and 68, splined respectively to a hub 70 of the secondary turbine member and the output shaft, supporting therebetween pivot shafts 72 for planet pinion gears 74 of the gear system. The planet pinion gears have meshing engagement between ring gear 58 and a sun gear 76 mounted by way of one-way roller members 78 upon stationary quill 46 for the controlled rotation of sun gear 76 in one direction and inhibition of rotation in the opposite direction, the purpose of which will hereinafter appear.

Although the secondary turbine member is disclosed as being interconnected to the output shaft by way of pivot shafts 72 for the pinion gears for the purpose of providing the most practical engineering design arrangement therefor, it could equally as well be directly connected to the output shaft apart from the gear system. It is essential to effect the proper and desired operation of the planetary gear system in conjunction with the primary and secondary turbine members that the planet pinion gears are rotatably mounted on the output shaft and that the secondary turbine is affixed to the output shaft, thereby establishing the operating relation of the secondary turbine to the primary turbine and planetary gear system.

The desired operational relation between the planetary gear system and the primary and secondary turbine members is achieved through the predetermined design of the blades of the pump, turbine and reactor members representative of which are the showing of Fig. 2 and Fig. 3. In viewing Fig. 2 it is to be noted that the discharge from the pump is initially received by the primary turbine as a result of the fluid flow following the path indicated by the arrows A in the toroidal circuit of Fig. 1. The fluid impinging on the primary turbine after effecting a rotation thereof as a result of the load on the output shaft being overcome is then discharged therefrom and impinges against the secondary turbine member from whence it discharges against the reactor member which presents an abutment to the fluid flow because of its being secured against rearward rotation by the one-way roller clutch 44. The relation of blade curvature at the discharge of the secondary turbine member to the intake of the reactor member is such as to require fluid flow from the secondary turbine member to substantially tangential from axial to release the reactor blades from abutment position and permit of the free forward rotation thereof. In this way higher speeds of rotation are required of the secondary turbine member before cessation of fluid impingement against the reactor blades in their abutment position, thus extending the torque amplification range of the transmission.

The pump blades as shown by Fig. 3 present an angle to the fluid discharge from the reactor member as an aid to the forward rotation thereof and return of the fluid with a minimum of turbulence into straight axial discharge from the discharge end of the pump blades. This defines a mere initial circuitous flow of the fluid through the toroidal circuit of the hydraulic torque converter for the purpose of setting forth fluid flow relation between the members thereof.

Under conditions wherein the hydraulic torque converter is placed in operation as a result of the rotation of the pump by power delivered to the input shaft and the output shaft is placed under ample load, the maximum output torque of transmission is obtained at or just prior to the rotation of the primary turbine member. At this stage wherein the secondary turbine member has not yet begun to rotate and the reactor member offers abutment to the fluid, the torque output of the transmission is a multiple of the torque amplification of the primary turbine and the gear ratio of the gear system.

As an example, let's say the primary turbine amplifies the torque by 2.25 and the gear ratio with the sun gear fixed and no rotation imparted to the output shaft and planet pinion gears by the secondary turbine member is 1.5 to 1, with the result that the torque amplification at starting torque is 2.25 times 1.5 or 3.375.

Upon increased speed of rotation of the pump and a proportionate increase in speed of the primary turbine member the fluid discharging from the pump is impinged thereon and as the angle of discharge of the fluid from the primary turbine member changes so as to impinge on the secondary turbine member to effect a rotation thereof, the torque output at the output shaft decreases, as a result of the decreased amplification of torque of the primary turbine member and the decreased gear ratio. The torque amplification of the primary turbine decreases as a result of the fluid flow discharge therefrom whereas the gear ratio decreases due to the fact that the speeds of the primary and secondary turbine members approach one another thus accounting for ratio change due to the reduction in relative rotation of the planet pinion gears and ring gear. At the same time that the torque amplification of the primary turbine member and the ratio of the gear system decreases, the secondary turbine produces amplified torque such that the torque output at the output shaft decreases smoothly with increased speed of rotation of the pump, and primary and secondary turbines.

A decreasing torque as a collective output of the gear system and primary and secondary turbine members continues until such time as the proportion of speed of the primary turbine member to the secondary turbine member is equal to or less than the maximum gear ratio. When this condition occurs, the sun gear is free to rotate in the like direction as the secondary turbine member resulting in free rotation of the primary turbine member. At this time the secondary turbine member continues to produce a low value torque of, say for example, of the order of 1.3 with the reactor member offering an abutment to the discharge of fluid from the secondary turbine member. With a further increase in speed of the pump and the attainment of speed of the secondary turbine member substantially equal to the pump the discharge fluid from the secondary turbine acts to move the reactor member forward in a direction of rotation with the secondary turbine member such that it frees itself from the one-way clutch 44, thus rendering the pump and secondary turbine member to the class of a fluid coupling device. The rotation of the pump as such is then transmitted in a substantially 1 to 1 ratio by way of the secondary turbine member to the output shaft.

As a means of obtaining torque amplification of the transmission once the torque converter has reverted to a straight fluid coupling should such torque be required for pass-by acceleration, control means 80 as disclosed by Fig. 4 can be adapted to the transmission set up.

The control means 80 is in the form of an electromagnetically controlled clutch 82 including a clutch plate 84 mounted for rotation on the hub of the secondary turbine member adapted to be electromagnetically attracted to pole piece 86 fixedly mounted by way of planet pinion gear pivot shafts 88 to the output shaft of the transmission. An electromagnet 90 is mounted in the pole piece 86 and is supplied current from a battery 92 through electrical circuit 94. The electrical circuit includes a lead line 96 from the electromagnet terminating in a conductor ring 98 adapted to be electrically engaged by a current transmitting spring pressed brush 100 which in turn is associated with an electrical conductor ring 102 mounted with the brush upon housing 30. The ring 102 is in turn contacted by a current conducting member 104 having a lead line connected at its opposite end with a make and break switch back through to the battery. The make and break switch which is normally held closed providing for the direct connection of the secondary turbine member to the output shaft such as in the case of the structure of Fig. 1 is adapted by the kick-down of an accelerator or other manual control beyond its normal operating range to be opened thus releasing the secondary turbine member from direct connection with the output shaft 18 of the transmission. Upon the disconnection of the secondary turbine member the planetary gear system by way of the primary turbine member is effective to deliver full gear ratio or torque amplification to the output for the pass-by acceleration required when the pump and primary turbine member are operating at a substantially 1–1 ratio.

If the arrangement of the two stage turbine member and single stage reactor member of Fig. 1 does not extend the range of torque amplification as high as desired the reactor member as disclosed by Fig. 4 can be separated into two stages 106 and 108 respectively, each having its own blades of predetermined design and being operable independently of one another in its effect and control. The reactor stages each have their own one-way clutch control 110 and 112 respectively permitting of the full rotation thereof independent of one another when the fluid flow in the toroidal circuit does not impinge on the blades thereof in abutment relation. The blades of reactor stage 106 are of such design as to afford an effective abutment surface for low speeds of the transmission and the blades of reactor stage 108 are of such design so as to extend the torque amplification to higher speeds, thereby conjointly the reactor stages provide both high torque amplification at low speeds and extended torque amplification at higher speeds. The reactor stages 106 and 108 are adapted for substitution in the structure of Fig. 1 equally as well as that of Fig. 4 to render the function required thereof.

Although the transmissions as hereinbefore defined are applicable primarily to vehicles, they are susceptible of adaptation to many varied uses wherein the resultant achievements and capabilities thereof are desirable and accordingly the invention in its basic respect is to be limited only to the extent of the appended claims.

What I claim is:

1. A power transmitting mechanism comprising a toroidal fluid circuit including cooperating pump, primary and secondary turbines and reactor means, a power input member connected to the pump, a power output member connected to the secondary turbine, a planetary gear system including a ring gear connected to the primary turbine, a sun gear, and a set of planet pinion gears pivotally mounted for rotation on the output member having meshing engagement with the ring and sun gears, brake means for preventing reverse rotation of the reactor means and other brake means for preventing reverse rotation of the sun gear.

2. A power transmission comprising fluid flow cooperative pump, turbine and reactor means, said turbine means including two separate stages, a power input member coupled directly to the pump, a power output member coupled directly to the second stage turbine means, means for preventing reverse rotation of the reactor means, a planetary gear system including planet pinion gears mounted for rotation on the output member, a sun gear having meshing engagement with said pinion gears, and a ring gear affixed to the first stage of the turbine means having meshing engagement with said pinion gears, and means for preventing reverse rotation of the sun gear.

3. A transmission according to claim 2 wherein means are provided for uncoupling the secondary turbine from the power output member.

4. A transmission according to claim 2 wherein an electromagnetically engageable clutch couples the secondary turbine to the power output member.

5. A transmission according to claim 4 wherein the current flow to the clutch is switch controlled.

6. A transmission according to claim 4 wherein a pedal is provided for controlling the current supplied to the clutch.

7. A transmission according to claim 3 wherein the reactor means is separated into two stages, each being independently prevented from reverse rotation.

8. A power transmission comprising a driving member, a driven member, a fluid power transmitting unit interposed between the driving and driven members including a pump coupled directly to the driving member, a primary turbine member, a secondary turbine member directly coupled to the driven member, and a reaction member, each of the pump, turbine and reaction members having blades of predetermined configuration mounted thereon, a planetary gear train, one element of which is directly affixed to the primary turbine, another element of which is supported for rotation on the secondary turbine and yet another element of which is inhibited from reverse rotation, and means for inhibiting reverse rotation of the reaction member.

9. A power transmission comprising a driving member, a driven member, a toroidal fluid circuit including bladed pump, primary and secondary turbine, and reaction members arranged in cooperative adjacent fluid flow relation, said pump being coupled directly to the driving member and said secondary turbine being coupled directly to the driven member, means for preventing rotation of the reaction member in one direction, a planetary gear train including a ring gear coupled directly to the primary turbine, a sun gear inhibited from rotation in one direction, and planet pinion gears, meshing with the ring and sun gears, supported for rotation on the driven member.

10. A power transmission comprising a power input member, a power output member, a fluid power transmitting device interposed between the input and output members including consecutive adjacently arranged fluid flow cooperative pump, primary and secondary turbine, and reaction members, the pump and secondary turbine being respectively operatively connected to the input and output members, means for preventing the reverse rotation of the reaction member, a planetary gear train including a ring gear, a sun gear and pinion gears, meshing with the ring and sun gears, said ring gear being fixedly secured to the primary turbine, means for preventing reverse rotation of the sun gear and means, having the pinion gears rotatably mounted thereon, operatively connecting the secondary turbine to the output member.

11. A transmission according to claim 10 wherein the reaction member comprises two separate stages.

12. A power transmission comprising a pump having a series of fluid impelling blades, a primary turbine having a series of blades of predetermined angularity receiving the fluid discharged from the pump, a secondary turbine having blades of greater angularity at the intake thereof than the primary turbine receiving the fluid discharged from the primary turbine, an abutment member having blades of reverse angularity to the angularity of the discharge of the blades of the secondary turbine receiving the fluid discharged therefrom and returning it to the pump intake, means for preventing reverse rotation of the abutment member, a planetary gear train including a ring gear secured to the primary turbine, a sun gear, and planet pinions rotatably supported on the secondary turbine having meshing relation with the sun and ring gears, a driving member connected to the pump, a driven member connected to the secondary turbine and means preventing reverse rotation of the sun gear.

13. A transmission according to claim 7 wherein the two stages of the reactor means are in adjacent relation to one another.

14. A transmission according to claim 2 wherein the first stage of the turbine is arranged at the position of maximum radius of fluid flow among the pump, turbine and reactor means.

15. A transmission according to claim 2 wherein the first stage turbine means is disposed radially outwardly of the reactor means.

16. A transmission according to claim 15 wherein the second stage turbine means is axially spaced from the pump means by the first stage turbine means and the reactor means.

17. A transmission according to claim 9 wherein the reaction member comprises two separate stages.

18. A transmission according to claim 11 wherein the stages of the reaction member are arranged adjacent to one another and are provided with blades having reverse angularity to one another.

19. A transmission according to claim 18 wherein the stages of the reaction member are prevented from reverse rotation independently of one another.

20. A transmission according to claim 12 wherein means are provided for preventing reverse rotation of the abutment member.

21. A transmission according to claim 20 wherein the primary turbine is disposed radially outwardly of the abutment member.

22. A transmission according to claim 2 wherein circumferentially spaced shafts connect the second stage turbine means to the output member and wherein the pinion gears are journalled on the circumferentially spaced shafts.

23. A transmission according to claim 4 wherein the electromagnetic clutch includes a pole member connected to the output member by journal support means for the pinion gears and an armature affixed to the second stage turbine means.

ROBERT C. RUSSELL.

REFERENCES CITED

The following references are of record in the file of this patent:

UNITED STATES PATENTS

| Number | Name | Date |
|---|---|---|
| 2,055,895 | Fawcett | Sept. 29, 1936 |
| 2,143,312 | Griswold | Jan. 10, 1939 |
| 2,260,015 | Fichtner | Oct. 21, 1941 |
| 2,283,486 | Berry | May 19, 1942 |
| 2,298,648 | Russell | Oct. 13, 1942 |